Patented Feb. 26, 1924.

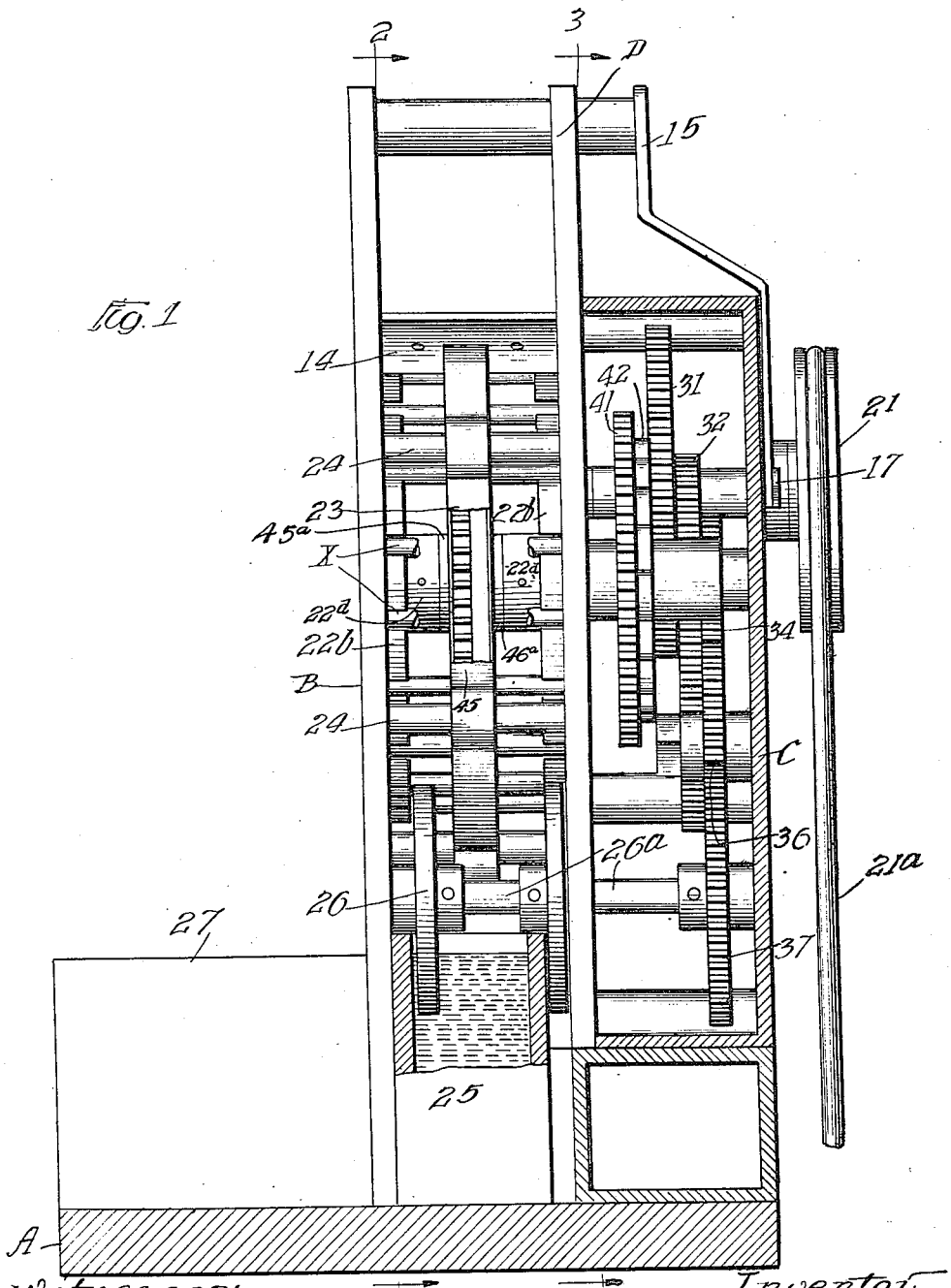

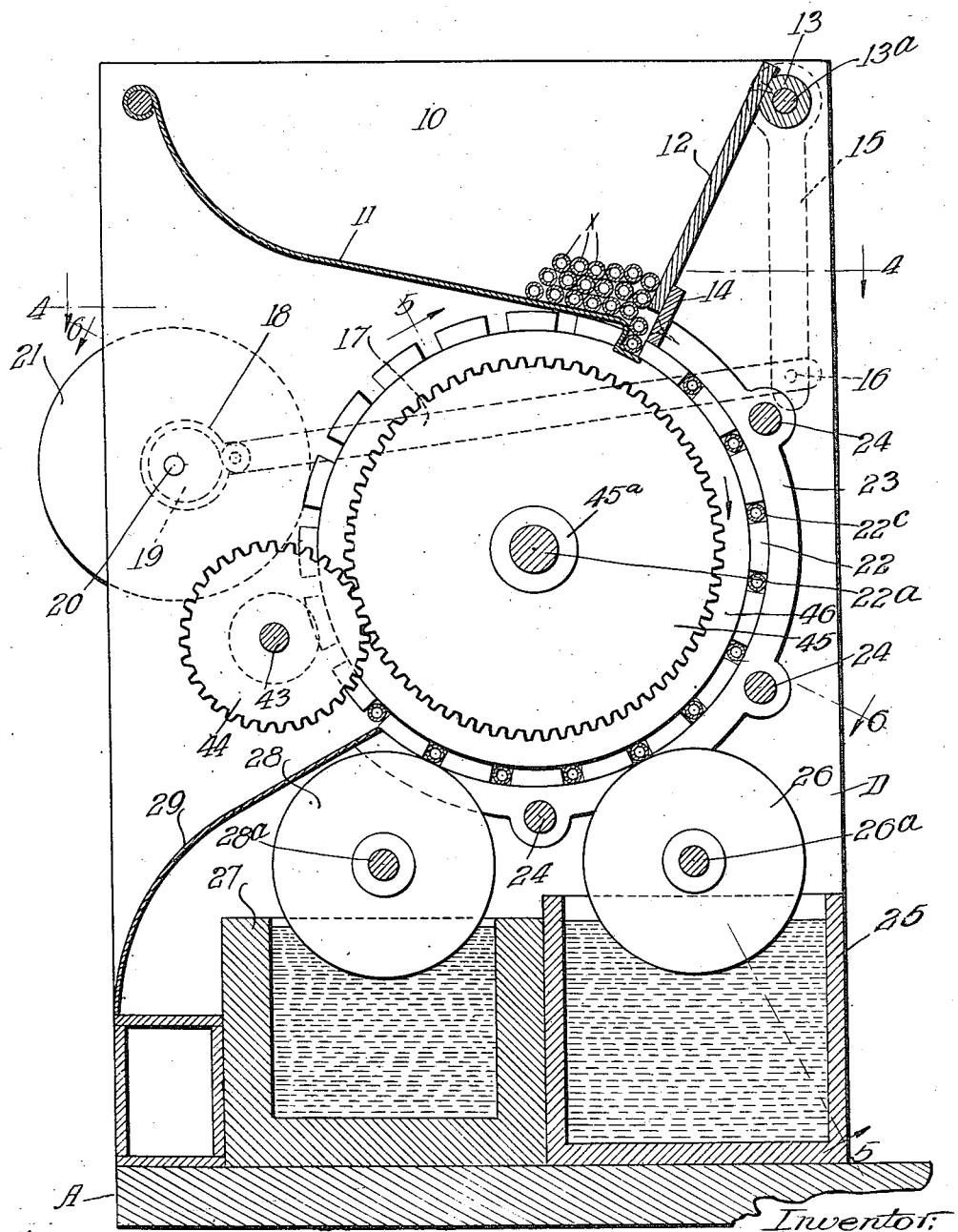

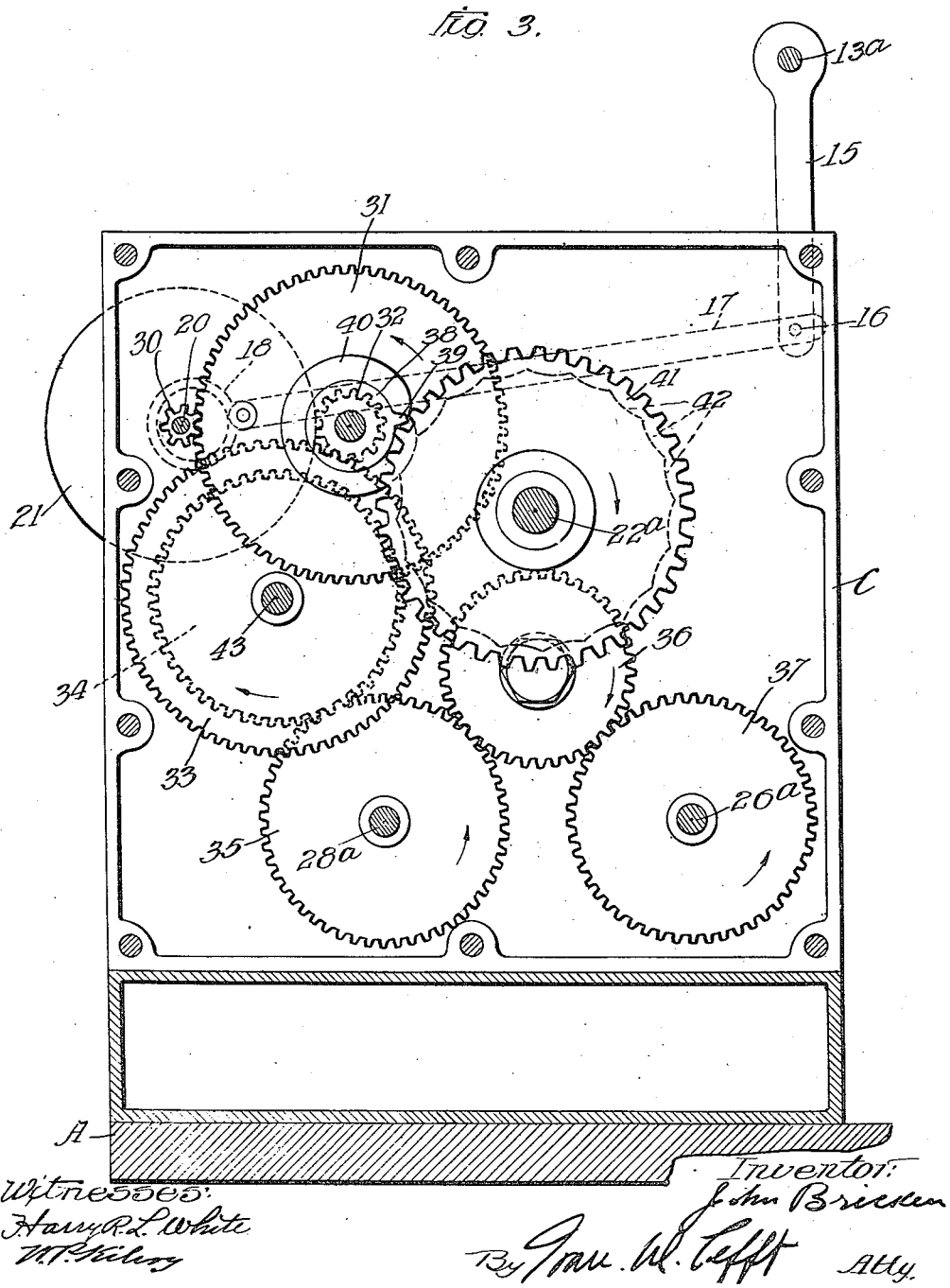

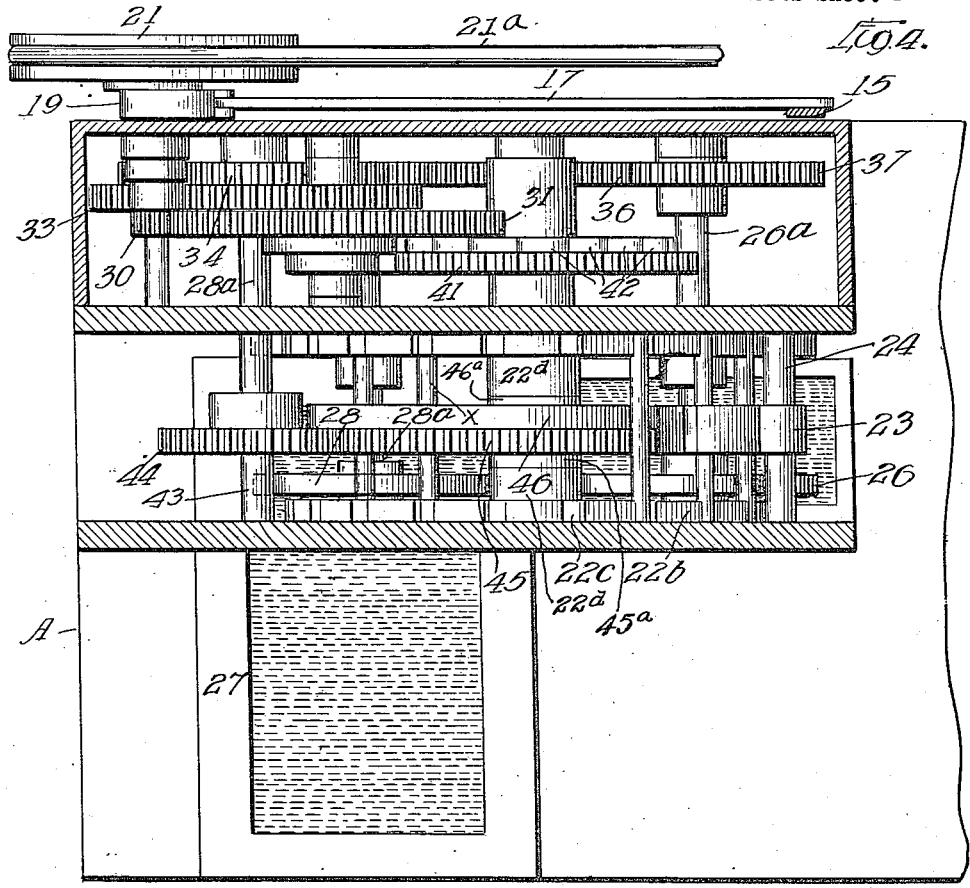

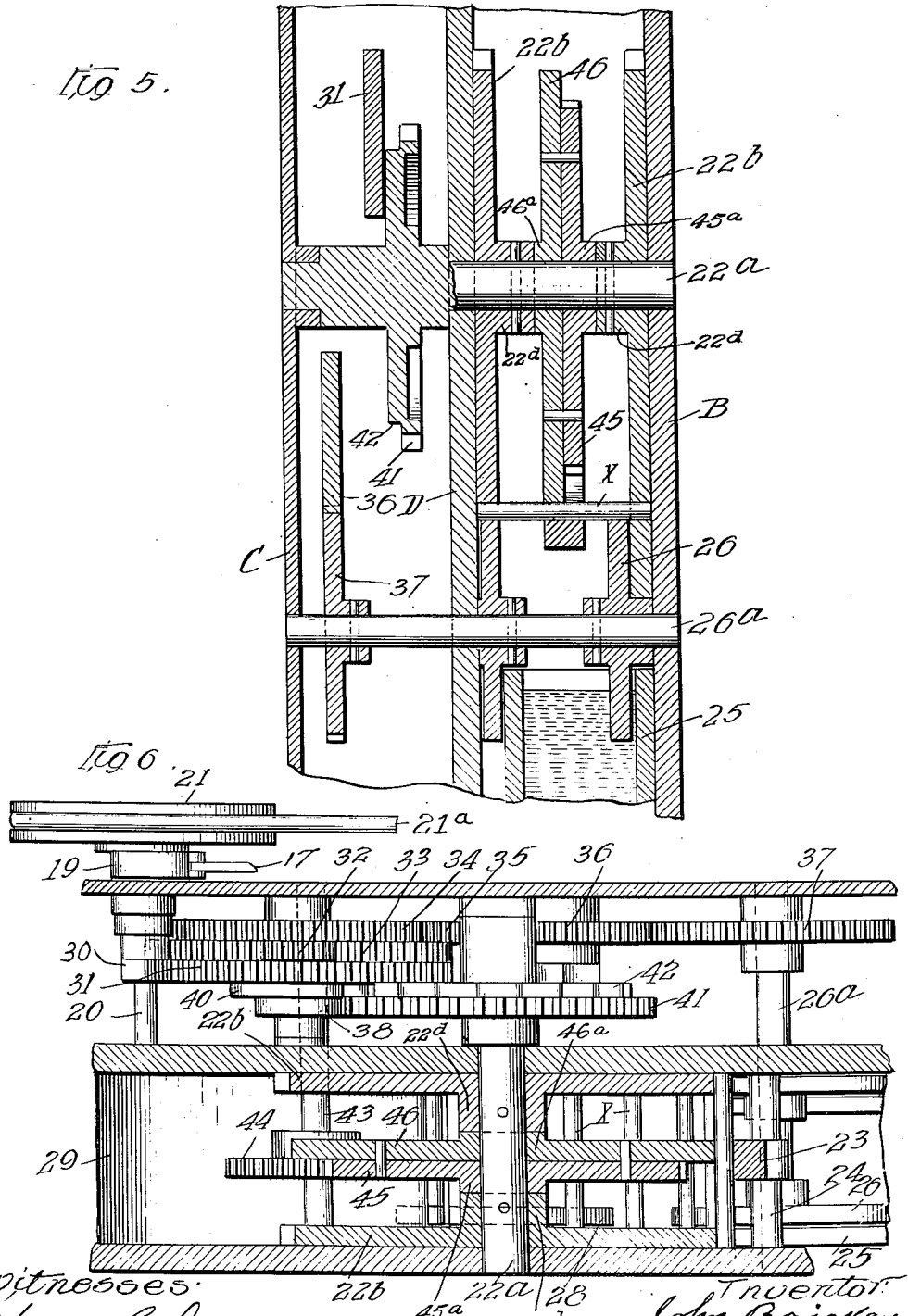

1,485,066

UNITED STATES PATENT OFFICE.

JOHN BRICKEN, OF CHICAGO, ILLINOIS, ASSIGNOR TO THE WAHL COMPANY, OF WILMINGTON, DELAWARE, A CORPORATION OF DELAWARE.

AUTOMATIC TINNING MACHINE.

Application filed January 13, 1921. Serial No. 436,948.

*To all whom it may concern:*

Be it known that I, JOHN BRICKEN, a citizen of the United States, and a resident of the city of Chicago, county of Cook, and State of Illinois, have invented certain new and useful Improvements in Automatic Tinning Machines, of which the following is a specification.

My invention relates to automatic tinning machines, or more particularly to a machine whereby cylindrically shaped objects may be automatically fed to a tinning mechanism and a ring of tin or solder applied thereon.

The object of my invention is in the provision of an automatic mechanism for conveying progressively, cylindrically shaped objects from a hopper to a tinning mechanism in order to have placed on said cylindrical objects a ring of tin or solder.

Another object of my invention is in providing a vibrating hopper mechanism in which a plurality of cylindrically shaped objects or tubes may be placed, said hopper vibrating in such a manner that a constant feed of the objects may be made to an alternatively moving conveyor.

Yet another object is in the provision of a conveyor or carrier formed in such manner as to be capable of conveying the cylindrically shaped objects from the hopper to a tinning mechanism in a progressive manner with a so-called "Geneva" movement.

A still further object of my invention is in the provision of a continuously moving drum member for exerting a slight tension on the cylindrically shaped tubes at the time they are having a band of solder or tin impressed thereon, said drum insuring a uniform soldered or tin band and also being a means for expelling the soldered tubes from the conveyor.

My invention will be further described in the following specification and claims in conjunction with the annexed drawings in which;

Fig. 1 is a front elevation of the machine, a portion being cut away in order to show the arrangement of the gears and working parts, Fig. 2 is a longitudinal sectional view on the line 2—2 of Fig. 1, Fig. 3 is a longitudinal sectional view on the line 3—3 of Fig. 1, Fig. 4 is a sectional view on the line 4—4 of Fig. 2, Fig. 5 is a sectional view on the line 5—5 of Fig. 2, Fig. 6 is a sectional view on the line 6—6 of Fig. 2, Fig. 7 is a perspective view of the cylindrically shaped object or tube before the ring of tin or solder is placed thereon, Fig. 8 is a sectional view on the line 8—8 of Fig. 7, Fig. 9 is a perspective view of the cylindrically shaped object after the ring of tin or solder has been impressed thereon; and Fig. 10 is a sectional view on the line 10—10 of Fig. 9.

Referring to the drawings A is a base plate upon which the machine is mounted, side plates B and C enclose the working parts of the machine. An inner wall D separates the gear mechanism from the actually working portions. The upper portions of the side wall B and inner wall D form the sides of a hopper or container means 10, the width of the hopper is consistent with the length of the cylindrically shaped objects to be operated upon and the length of said tubes once established for each machine cannot be changed. It is understood, however, that machines for handling different length tubes is anticipated. The hopper 10 has a base or bottom plate 11 sloping downwardly and forwardly to a feed opening at its lowest point. A vibrating front plate 12 forms a final retaining wall for the plurality of tubes X contained within the hopper. The forward end of said plate rests against a stop plate 14 at the feed opening of the hopper. The plate 12 is fixedly mounted with relation to a bearing 13 rotatable upon a shaft 13ª. The lever 15 connected to the bearing 13 has pivotally mounted thereon at its lower end the arm 17 which has pivotal connection with an eccentric strap 18 mounted on the eccentric 19 on the power shaft 20. A power pulley 21 has power furnished through a belt 21ª in connection with an electric motor or any appropriate power means not shown. Directly beneath the hopper is a conveyor 22 having concentric hubs 22ᵈ integral therewith. Said conveyor is composed of side walls 22ᵇ and is fixedly mounted on a shaft 22ª, said walls having on their periphery regularly spaced indentations or receptacles 22ᶜ. The above described conveyor is mounted in conjunction with the hopper in such a manner that the cylindrically shaped objects contained in the hopper may be fed progressively and automatically into the notched portions of the conveyor as it rides beneath the feed opening of the hopper. Partially surrounding the conveyor and mounted in such a manner as to be impressed against only the outer middle portion of the tubes carried in the container is a retaining member 23 held in position with relation to the side walls by shafts 24. The above retaining member is mounted in such a manner as to hold the tubes in the conveyor from the time they are fed from the feed opening until they have passed the tinning mechanism, to be described later, to a point where the final tining operation has been completed and the tubes are ready for ejection from the machine.

An acid pot 25 is mounted in a suitable position on the base plate B, said pot containing acid necessary for the tinning operation. An acid roll 26 mounted on the shaft 26ª suitably housed in the side walls of the machine, is partially submerged slightly in the acid and at its upper portion presses against a determined part of a tube carried in the conveyor. A second pot 27 is mounted on the base plate B in conjunction with the pot 25, the pot 27 having solder contained therein and a tinning roll 28, said roll being carried by a shaft 28ª. The tinning roll 28 is also partially submerged slightly in the solder and at its upper portion presses against a determined part of a tube carried in the conveyor. Any means not shown may be used for heating the solder within the soldering pot to the necessary temperature.

It will be seen from the above that a tube carried in the intermittently moving conveyor will be progressively acted upon by the acid roll and then the tinning roll prior to its ejection from the machine. A slide 29 is mounted in conjunction with the lower end of the retainer 23 and furnishes an exit means for the tubes just after the ring of tin or solder has been placed thereon. Power transmitted to the machine through the power pulley 21 is communicated to the pinion 30 which meshes with the gear 31, said gear having mounted thereon a small gear 32. This gear communicates the power to a larger gear 33, said gear having mounted thereon a slightly smaller gear 34. The gear 34 is meshed with a gear 35, said gear driving the power shaft 28ª which operates the tinning roll. An intermediate gear 36 communicates the power from the gear 35 to gear 37, said gear operating the power shaft 26ª which drives the acid roll 26. Mounted in conjunction with gear 32 is a plate 38 having a single lug or tooth 39 thereon. Mounted in conjunction with said plate and laterally thereof is a lock plate 40. The tooth 39 meshes with the gear 41 and at each revolution of the plate 38 gives the gear 41 a slight but uniform movement. To preclude any backward or forward movement of the gear 41 when not acted upon by the tooth 39, the rounded portions of the lock plate 40 ride in corresponding arcuate shaped depressions in a plate 42 integral with the gear 41. A power shaft 43 operated by gear 33 furnishes the power for a gear 44, said gear meshing with a large gear 45, and this gear being cast integral with a drum member 46. The gear 45 and drum 46 are provided with hubs 45ª and 46ª respectively, which are loosely mounted on the shaft 22ª. This so-called drum member, rotatable on the same shaft 22ª upon which the conveyor is mounted, rides midway of the two walls of the conveyor. The drum is of such diameter that a slight tension will be exerted against the inner portions of the tubes carried in the conveyor.

As has been previously described, when an intermittent or "Geneva" movement has been imparted to the gear 41, said gear 41 imparts power to the shaft 22ª upon which the conveyor 22 is mounted. In other words, the start and stop movement given to the gear 41 will be transmitted to the conveyor, said conveyor having a clockwise movement. Again, as has been described, power has been transmitted through related gears to the drum gear 45 in such a manner as to give this gear a constant and counter clockwise movement. Again, coming to the action of the drum member 46 on the tubes contained in the conveyor, we find that the conveyor having an intermittent clockwise movement and the drum member operating constantly in a counter clockwise movement and exerting a slight tension against the inner mid portion of the tubes contained in the conveyor, the drum member will tend to revolve the tubes in their sockets. Following the action of the acid and tinning rolls on the tubes, the drum member with its slight tension against the inner side of the tubes will tend to force the tubes from their sockets when they pass from the retaining grasp of the member 23. This tension of the drum will be sufficient to expel the tubes from their sockets and down the slideway 29 to a suitable receptacle. The operation of the machine is as follows:

A plurality of cylindrically shaped tubes or objects are placed within the hopper 10. Power having been transmitted to the machine, the vibrating plate in the hopper will immediately begin to function and the moving parts of the machine to operate. The feed opening of the hopper being sufficient for but one tube to pass therethrough, the conveyor, passing beneath this opening, picks up but a single tube in each of its receptacles. The conveyor, in its socalled "Geneva" movement, gradually carries the tubes to the acid roll and the conveyor is so timed that when a tube is in position to be operated upon by either the acid roll or the tinning roll the conveyor will be in a stationary position, at least, for a short time. However, the constantly revolving acid roll and the counter clockwise movement of the drum member against its inner side constantly forcing it towards the acid roll will cause the tube to be revolved within its receptacle in the conveyor and to have a band of acid placed thereon entirely encircling it at a determined point. The conveyor now carries the tube, having been acted upon by the acid, to the tinning roll where a similar action of the tinning roll and drum member takes place to form a complete ring of tin or solder upon the tube at a determined point thereon. Again, the conveyor carries the tube beyond the grasp of the retainer and the drum member forces the soldered tube down the slideway and out of the machine.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. In automatic tinning machine; in combination a hopper member; means for vibrating said hopper; a conveyor; power means for giving said conveyor an intermittent movement; a retainer; a tension drum member; means for continually operating said member; an acid roll; a tinning roll; and power means for operating said acid and tinning roll.

2. In an automatic tinning machine; in combination a vibrating hopper member; a tube conveyor; a retainer; a drum tension member; an acid pot, a soldering pot; an acid roll; a tining roll; and power operated means for operating said mechanism.

3. In an automatic tinning machine; in combination a vibrating hopper member; an intermittent tube conveyor; a tube retainer; means interposed between a solder receptacle and the intermittent tube conveyor for transferring solder to the tubes, and a tension member acting in conjunction with the aforementioned means to retard the tubes thus enabling a complete ring of solder to be placed thereon; and power means for operating said mechanism.

4. In an automatic tinning machine; in combination a power operated tube conveyor; means for feeding tubes to said conveyor; a tinning mechanism; and power operated tension means in conjunction with said tinning mechanism for encircling said tubes with a ring of tin or solder when said tubes are in the conveyor.

5. In an automatic tinning machine; in combination a tube containing member; an acid pot, a solder pot, a conveyor for carrying the tubes; means interposed between the acid pot and the conveyor for transferring acid to the tubes; means interposed between the solder pot and the conveyor for transferring solder to the cylindrical shaped tubes, and a power operative means for revolving the tubes in the conveyor when in contact with the means for conveying the acid and solder to the tubes, in such a manner that a complete ring of tin or solder will encircle the tube.

6. In a machine of the class described; in combination a tube container; a tube conveyor; an acid pot; a solder pot; means interposed between the acid pot and solder pot for transferring acid and solder to a predetermined point upon the tubes, and means acting in conjunction with the aforementioned means for placing a ring of solder on the tubes.

7. In a machine of the class described; in combination a tube container; a tube conveyor, including a power shaft, side walls concentrically mounted on said shaft, said walls having tube receiving indentations therein; means for supplying power to said shaft in such a manner that the conveyor will be given an intermittent movement, and means interposed between the said conveyor and a solder pot for conveying solder to the tubes mounted in the indentations.

8. In a machine of the class described; in combination a tube container; a tube conveyor, including a power shaft, side walls concentrically mounted on said shaft, said walls having tube receiving indentations therein; means for supplying power to said shaft in such a manner that the conveyor will be given an intermittent movement; means interposed between the said conveyor and a solder pot for conveying solder to the tubes mounted in the indentations; and means co-operating with the means interposed between the solder pot and the conveyor for placing a ring of solder about the tubes.

9. In a machine of the class described, in combination a tube conveyor, a solder pot, means interposed between the solder pot and the tube conveyor for transferring solder to the tubes; a tube container for progressively feeding the tubes to said conveyor including side walls, a downwardly projecting bottom plate, a feed opening, a vibrating front plate; and a power means for vibrating said plate.

In witness whereof I have hereunto subscribed my name.

JOHN BRICKEN.